US008020041B2

(12) United States Patent
Huang et al.

(10) Patent No.: US 8,020,041 B2
(45) Date of Patent: Sep. 13, 2011

(54) METHOD AND COMPUTER SYSTEM FOR MAKING A COMPUTER HAVE HIGH AVAILABILITY

(75) Inventors: Jian Huang, Beijing (CN); Jin Ling, Beijing (CN); Yin Ben Xia, Beijing (CN); Zhe Xiang, Beijing (CN); Jian Ming Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 12/473,788

(22) Filed: May 28, 2009

(65) Prior Publication Data

US 2009/0300414 A1 Dec. 3, 2009

(30) Foreign Application Priority Data

May 30, 2008 (CN) .......................... 2008 1 0098727

(51) Int. Cl.
*G06F 11/00* (2006.01)
(52) U.S. Cl. ................ 714/11; 714/12; 718/1
(58) Field of Classification Search .............. 714/10–13; 718/1
See application file for complete search history.

(56) References Cited

U.S. PATENT DOCUMENTS

| 5,488,716 A | 1/1996 | Schneider et al. |
| 6,625,751 B1* | 9/2003 | Starovic et al. ................. 714/11 |
| 7,840,839 B2* | 11/2010 | Scales et al. .................... 714/13 |
| 2002/0198734 A1* | 12/2002 | Greene et al. ..................... 705/1 |
| 2006/0085792 A1* | 4/2006 | Traut ........................... 718/100 |
| 2007/0094659 A1* | 4/2007 | Singh et al. ...................... 718/1 |
| 2007/0156973 A1* | 7/2007 | Fleischer et al. .............. 711/147 |
| 2007/0174658 A1 | 7/2007 | Takamoto et al. |

* cited by examiner

*Primary Examiner* — Yolanda L Wilson
(74) *Attorney, Agent, or Firm* — Vazken Alexanian

(57) ABSTRACT

A method and a computer system for making a computer achieve high availability. The method includes running a host virtual machine on a host virtual machine container; running a servant virtual machine on the servant virtual machine container; and synchronizing the host virtual machine and the servant virtual machine by using an I/O instruction. The system includes at least two computers including a host computer and a servant computer, each computer including a virtual machine container; a virtual machine running on the virtual machine container; and a communication channel making the virtual machine container execute a virtual machine synchronization operation. The virtual machine synchronization operation of the virtual machine container is triggered by the virtual machine executing I/O instructions.

10 Claims, 3 Drawing Sheets

METHOD AND COMPUTER SYSTEM FOR MAKING A COMPUTER HAVE HIGH AVAILABILITY

CROSS REFERENCE TO RELATED APPLICATION

This application claims priority under 35 U.S.C. 119 from Chinese Patent Application 200810098727.2, filed May 30, 2008, the entire contents of which are incorporated herein by reference.

FIELD OF THE INVENTION

The invention relates to a fault tolerant computer system, and particularly to a method and a computer system for providing high availability of a computer.

DESCRIPTION OF THE RELATED ART

Normally, a computer system often gets various failures due to various reasons, so that a user can not accomplish related work in time. Such failures of the computer system are called "unavailability". Those skilled in the art have been making efforts to overcome the various unavailabilities of the computer system, so that the computer system can have higher availability, or in other words, so that the computer system can have high reliability and low failure rate during use.

Accordingly, a common method in the art is to configure a host computer executing tasks with a standby computer. The host computer executes the task requested by the user and notifies the standby computer about various operations executed by it, so that when the host computer fails, the standby computer can take over the services which are required to be provided by the host computer. As such, the services provided to the user will not be interrupted by the hardware failure of the host computer. However, this kind of fault tolerant solution normally needs specific computer hardwares installed in the two computers, or needs to modify the operations of the computers, which will add unnecessary costs to those users who do not need to face the fault tolerant problems.

An existing approach to a fault tolerant system has proposed to construct a plurality of virtual machines in two physical machines, in which the virtual machines in the two physical machines can back up each other, and I/O operations of the virtual machines are obtained by a virtual machine monitor, and the number of the executed instructions is recorded by an RR (resume) register supported by hardwares, thereby executing the backup of the operations. After failure of one of the physical machines is repaired, the RR register is reset to zero, so that the host virtual machine is synchronized with the backup virtual machine. Although this solution solves the user's problems in the cost as well as the update and modification of operation programs, its synchronization speed does not satisfy the user.

Another existing approach to a fault tolerant computer system is to construct a host virtual machine and a servant virtual machine in two physical machines, and realize fault tolerance by performing the hot backup of the two virtual machines between the two virtual machines, in which the synchronization of the virtual machines is realized by a synchronization operation between the virtual machines. The existing technology requires the servant virtual machine to copy all the operations of the host virtual machine, that is, the virtual machines are frequently at a synchronization triggering state, so that the host virtual machine costs too many resources (CPU, etc.) in realizing the synchronization of the virtual machines, thereby accordingly reducing the resources necessary for the host computer to execute main task and influencing the main performance of the host computer.

SUMMARY OF THE INVENTION

One embodiment of the invention provides a method to achieve high availability for a computer. The method includes: providing a host computer with a host virtual machine container, and a servant computer with a servant virtual machine container; running a host virtual machine on the host virtual machine container, and running a servant virtual machine on the servant virtual machine container; and synchronizing the host virtual machine and the servant virtual machine by using an I/O instruction as a transaction boundary by a communication channel between the host computer and the servant computer. The method enables one machine to back up the other machine if the other machine fails.

In another embodiment, the invention provides a computer system to achieve high availability for a computer. The system includes: a host computer with a host virtual machine container; a servant computer with a servant virtual machine container; a host virtual machine running on the host virtual machine container; a servant virtual machine running on the servant virtual machine container; and a communication channel operatively connected between the host computer and the servant computer. The communication channel is configured to use an I/O instruction as a transaction boundary to trigger a synchronization between the host virtual machine and the servant virtual machine.

According to another aspect of the invention, a computer is provided that includes a virtual machine container and a virtual machine running on the virtual machine container. In this embodiment, the virtual machine includes: an instruction queue; a main memory; and a journal memory. The virtual machine is configured to load instructions from the main memory into its instruction queue, execute the instructions in the instruction queue and write the data into the main memory, and to write the instructions in the form of journal storage instruction into a journal memory of the virtual machine. The virtual machine is also configured to use an I/O instruction as a transaction boundary to trigger a synchronization operation with a virtual machine of an other computer.

DETAILED DESCRIPTION OF PREFERRED EMBODIMENTS

The invention is described in detail below in combination with the specification and the accompanying drawings.

High availability of a computer system means that even if one of the computers fails, the computer system can continue to operate. The present invention provides such a computer system having high availability.

Figure 1:
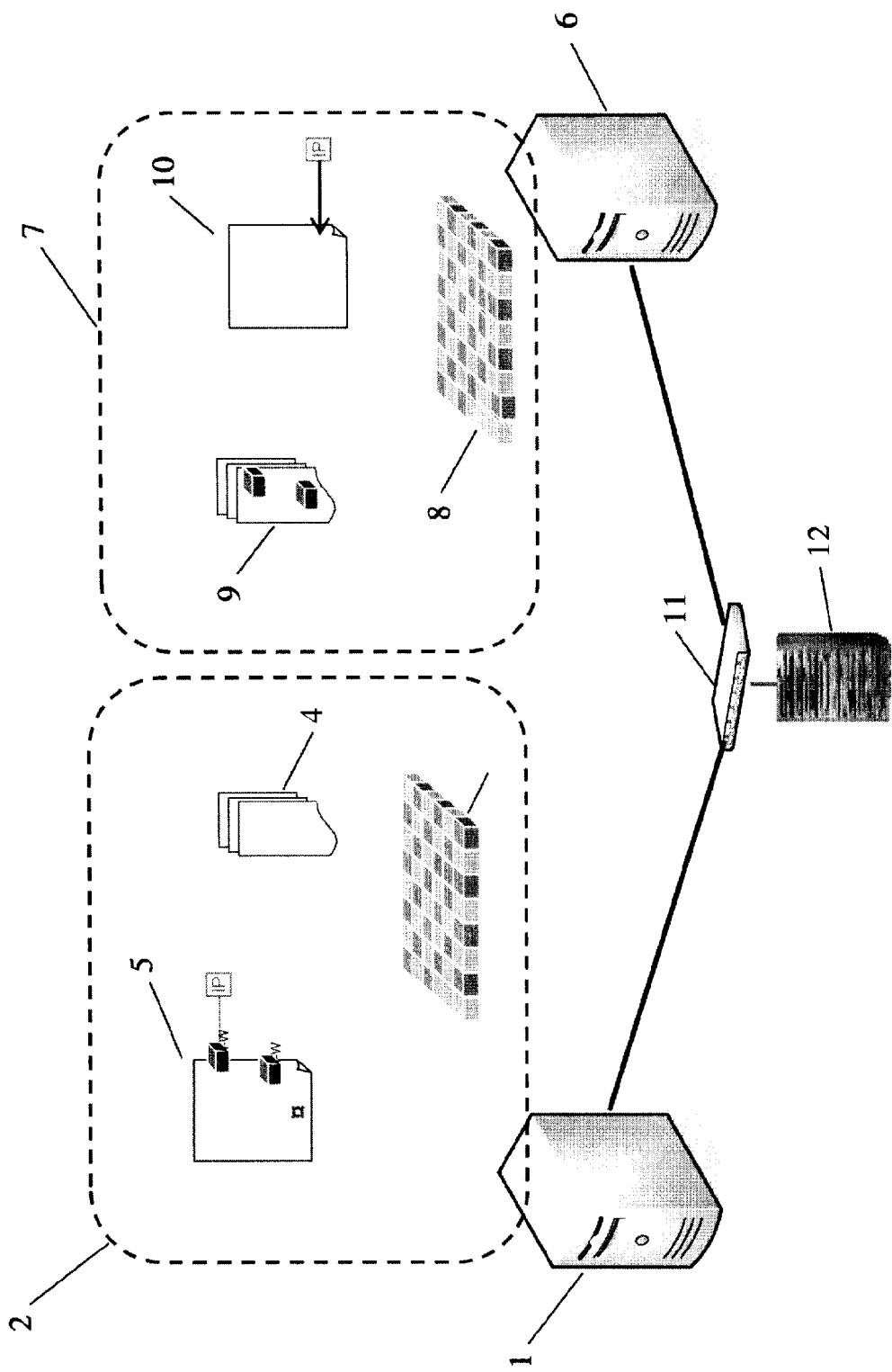
FIG. 1 is a schematic view illustrating the architecture of a computer system according to an embodiment of the invention.

Referring to FIG. 1, an embodiment of a computer system having high availability is illustrated. The computer system is composed of at least two physical machines (computers), in which one functions as a host physical machine 1 and the other functions as a servant physical machine 6. The two physical machines perform data communication with each other, for example, by a server 11 or other similar communication channels. The server 11 further includes a SAN memory. Each physical machine includes one virtual machine container.

The virtual machine container in the host physical machine is a host virtual machine container 2, while the virtual machine container in the servant physical machine is a servant virtual machine container 7. Virtual machine containers have main memories 3 and 8, and journal memories 4 and 9 respectively. The same operating system and the same application program run on the virtual machines on the two virtual machine containers. During running of the application programs, the virtual machines store results of the execution of the various instructions, and store the journals of the operations of the application programs into the journal memories 4 and 9. The virtual machines execute the instructions arranged in respective instruction queues 5 and 10, and write the execution results into the main memories.

In this embodiment of the invention, the actions of the virtual machines are divided into two types, which are memory (or register) read/write operation and I/O operation (for example, disc I/O). The host virtual machine of the computer system triggers a synchronization operation between the host virtual machine and the servant virtual machine by the I/O operations in the instruction queue. During the execution of the instructions in the instruction queue 5 by the host virtual machine, various commands between two adjacent synchronization points (I/O instructions) are saved into the journal memory 4 of the host virtual machine container in the form of journal storage instruction. During execution of the instructions in the instruction queue 5 by the host virtual machine, if the I/O operation instruction (synchronization point) occurs, the journal storage instruction stored in the journal memory is transmitted to the journal memory 9 of the servant virtual machine container, that is, the content in the journal memory 4 is copied into the journal memory 9, for being executed by the servant virtual machine. In this way, the synchronization between two virtual machines can be realized highly effectively.

Figure 2:
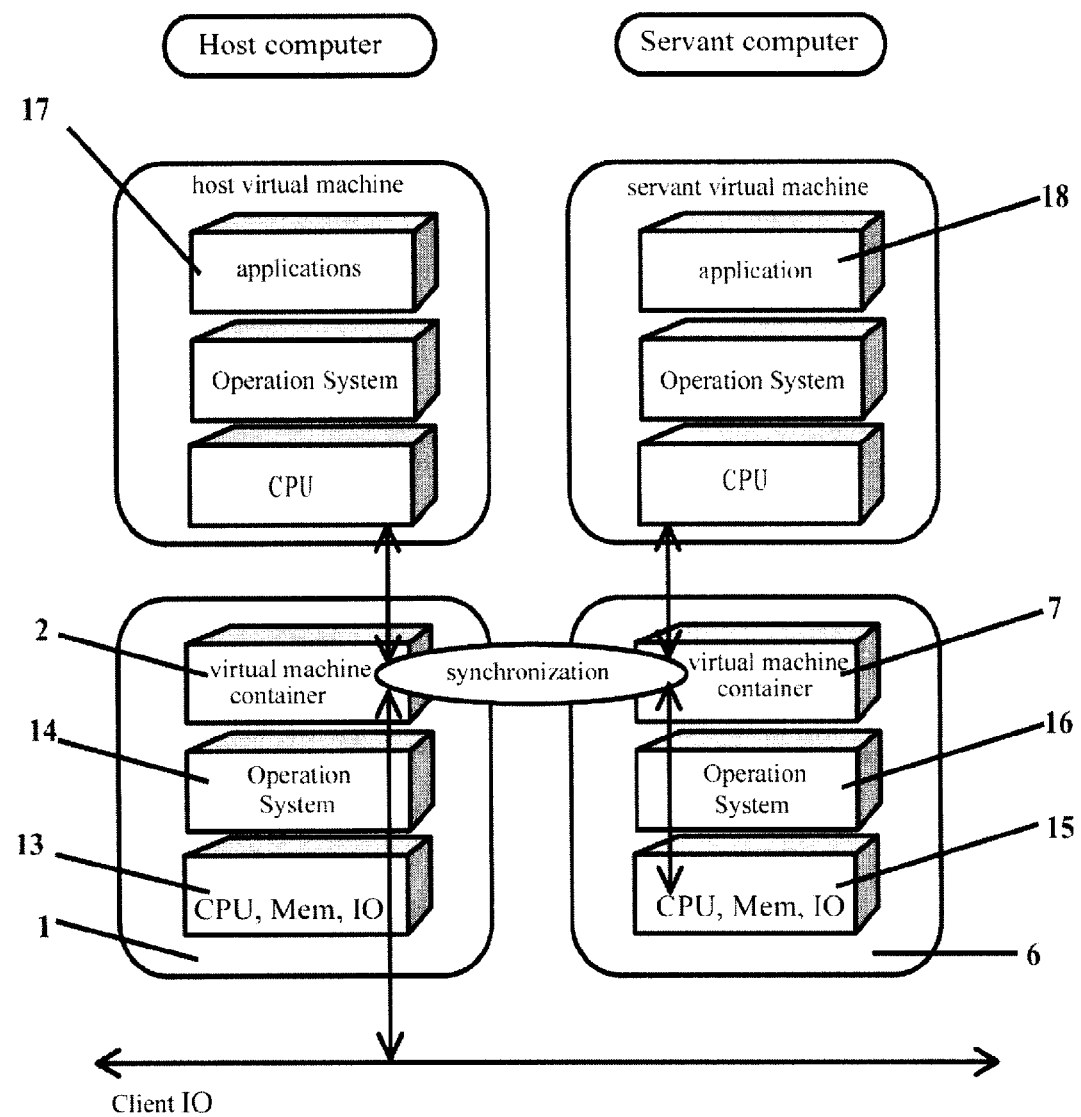
FIG. 2 is a schematic view illustrating the software configuration of a computer system according to an embodiment of the invention.

FIG. 2 is a schematic view illustrating the software configuration of a computer system according to an embodiment of the invention. As shown in FIG. 2, the physical machines 1 and 6 include CPUs, hardware integrations 13 and 15 of the memories and the input/output means respectively, and the operation systems 14 and 16 run on the corresponding hardware integrations, respectively. The virtual machine containers 2 and 7 run on the corresponding operation systems 14 and 16 respectively. The virtual machine containers 2 and 7 perform the synchronization with each other. One or more application programs 17 and 18 run on each virtual machine container respectively, and occupy a certain space of the CPU.

Synchronization between the virtual machines in the two physical machines is described in detail below. In the normal state, only one virtual machine container provides services to a client. The host computer communicates with the client over a client IO channel. The host virtual machine container and the servant virtual machine container cause the CPU states, main memories, memory accesses, clocks and interrupt requests of the two processors to be synchronized. The servant virtual machine container holds a replica of the memory and IO configuration. The servant virtual machine container can passively access the IO channel of the client. Synchronization of the two virtual machine containers includes synchronization of the CPU and main memory states as well as the memory accesses, synchronization of the clocks, synchronization of the interrupt requests and batch synchronization.

The CPU and main memory states as well as the memory accesses must be synchronized. When the CPUs of the two virtual machine containers begin to run from the same program counter in the same program in the same state context, they need to generate the completely same state type after each instruction and access the memories in the same way. The synchronization of the clocks is such that, although the arithmetic and logic executions must be the same, when the time shifts, the execution periods will be different.

Thus, when one CPU reaches one point to extract the current time stamp, it has to wait for its corresponding CPU to reach the same point. Subsequently, the synchronized virtual machine container pair agrees upon the time stamp, and notifies the two processors about the time stamp with the same value. Synchronization of the interrupt requests is set so that when the two virtual machine containers intend to raise one interrupt to their virtual processors (for example, the disc access is fully interrupted), they have to wait for their peer virtual machine containers to raise this interrupt. Subsequently, the synchronized virtual machine containers agree upon the interrupt point, and send the interrupt to the two processors. In order to improve performance, the memory mismatch detection can be realized by matching a group of accesses at the same time. In order to reduce the amount of communication load, they can use feature code (e.g. CRC, MD5) to verify whether data matches, which is batch synchronization.

Referring back to FIG. 1, in the instruction queue of the virtual machine containers 2 and 7, various instructions waiting for execution are arranged based on the running of the application program. The actions of the virtual machine container are divided into two types in the invention, which are memory (or register) read/write operation and I/O operation (for example, disc I/O). The host virtual machine container maintains the main memory of the computer and the journal memory, and loads various instructions into the main memory. Various memory read/write instructions and I/O instructions are arranged in the instruction queue, and the virtual machine container of the invention uses the I/O instruction as a transaction boundary, i.e., the transaction from the former I/O instruction to the latter I/O instruction is considered to be one transaction; one synchronization transaction is performed.

During the transaction, the host virtual machine container executes, for example, a memory write instruction so as to write the data into the main memory, and writes the memory write/read instruction in the form of journal storage instruction into the journal memory 4. The host virtual machine continues to execute various instructions in the instruction queue from the former I/O instruction until meeting the latter I/O instruction. At this time, the host virtual machine executes the I/O instruction, and copies the journal storage instruction between two adjacent I/O instructions, which is stored in the journal memory 4, into the journal memory 9 of the servant virtual machine container. Then the servant virtual machine container executes the journal storage instruction on the journal memory 9 to write the data into its main memory. With the above procedure, normal synchronization operation is realized between two physical machines.

When the host physical machine fails or crashes, i.e., when a mismatch occurs or the host virtual machine performs incorrect operations, the servant machine container will take over the communication channel with the client, run independently without synchronizing with the host virtual machine, and issue a notification to the system manager. At this time, the servant virtual machine container will survive and function. By comparing the program counters, the CPU states and the memory accesses, the synchronized virtual machine container is capable of detecting the abnormal condition, for example, the host physical machine fails or crashes. The manner of detection can be a conventional manner used in the art. After the host virtual machine container is repaired, the servant virtual machine will transfer the CPU and the main memory states, the memory access, the clock and the interrupt table to the repaired host virtual machine container. At this time, the host virtual machine container survives and the repaired virtual machine container becomes the servant virtual machine container.

Figure 3:
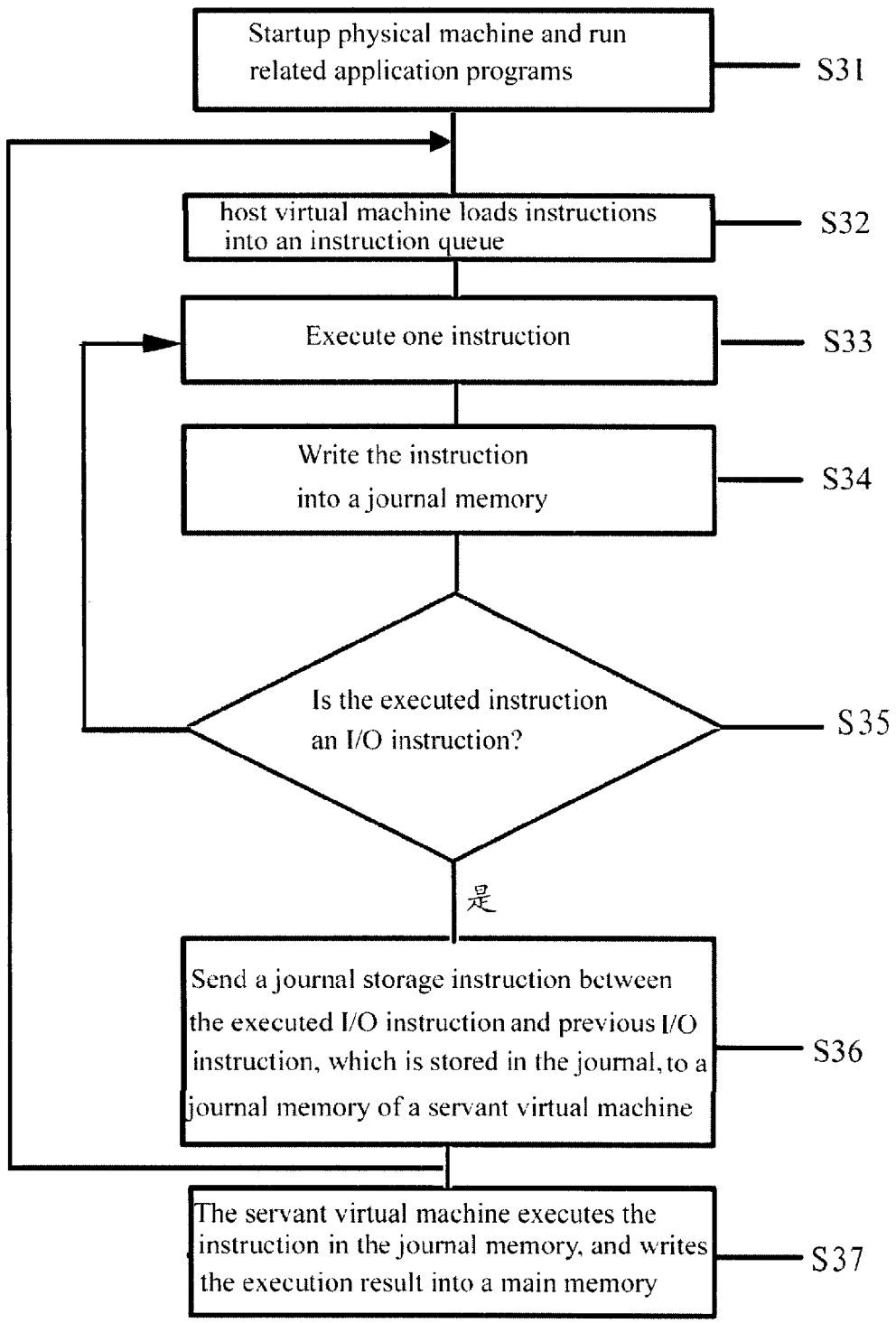
FIG. 3 is a flowchart of a method for synchronizing between at least two computers according to an embodiment of the invention.

FIG. 3 is a flowchart of a method for synchronizing two computers according to this embodiment of the invention. Beginning at step S31, the physical machines 1 and 6 are started, and related application programs are run. At step S32, the host virtual machine loads various instructions associated with the running of the application programs from the main memory to the instruction queue. At step S33, the host virtual machine begins to execute various instructions (or commands), including I/O instructions, and writes the result data of the executions of the instructions into the main memory. At step S34, the executed instructions are written into the journal memory in the form of journal storage instruction. At step S35, it is determined whether the executed instruction is the I/O instruction. If the determination result is "no", the process of the host virtual machine returns to step S33, so as to go on to execute the next instruction in the instruction queue. If the determination result is "yes", then the process of the host virtual machine proceeds to step S36.

At step S36, the host virtual machine sends the journal storage instruction between the executed I/O instruction and an I/O instruction before this executed I/O instruction, which is stored in the journal memory of the host virtual machine, into the journal memory of the servant virtual machine container. Then, after executing step S36, the host virtual machine returns to step 32 to repeat the above steps. At step S37, the servant virtual machine executes the journal storage instruction stored in its journal memory, and writes the running data into its main memory. By repeatedly performing the above steps, the various synchronizations between the host virtual machine container and the servant virtual machine container are realized.

The above description of embodiments of the invention is illustrative, but not exhaustive. The invention is not limited to the disclosed embodiments. It will be apparent to those skilled in the art that various changes and modifications may be made. Choosing these embodiments is for explaining the principle of the invention and its practical application, and making the persons skilled the art understand the invention, so as to realize various embodiments with various modifications for other expected use.

What is claimed is:

1. A method of providing high availability of a computer system, the method comprising:
    providing a host computer with a host virtual machine container;
    providing a servant computer with a servant virtual machine container;
    running a host virtual machine on said host virtual machine container;
    running a servant virtual machine on said servant virtual machine container;
    synchronizing the host virtual machine and the servant virtual machine by using an I/O instruction as a transaction boundary by a communication channel between said host computer and said servant computer so that one of said computers is enabled to back up the other computer if the other computer fails;
    loading instructions by the host virtual machine from its main memory into its instruction queue;
    executing the instructions in the instruction queue and writing the data into the main memory; and
    writing the instructions in the form of journal storage instruction into a journal memory in the host virtual machine.

2. The method according to claim 1, wherein the step of synchronizing the host virtual machine and the servant virtual machine includes synchronizing CPU register states and main memories of the host virtual machine and the servant virtual machine.

3. The method according to claim 1, wherein said using an I/O instruction as a transaction boundary in said synchronization step includes sending a journal storage instruction between said I/O instruction and a previous I/O instruction stored in said journal memory to a journal memory of the servant virtual machine.

4. The method according to claim 3, further comprising executing the journal storage instruction by the servant virtual machine in its journal memory, so as to synchronize the CPU register state and the main memory of the servant virtual machine with those of the host virtual machine.

5. A computer system having high availability, comprising:
    a host computer with a host virtual machine container;
    a servant computer with a servant virtual machine container;
    a host virtual machine running on said host virtual machine container;
    a servant virtual machine running on said servant virtual machine container;
    a communication channel operatively connecting said host computer and said servant computer; said communication channel being configured to use an I/O instruction as a transaction boundary to trigger synchronization between said host virtual machine and said servant virtual machine;
    an instruction queue;
    a main memory;
    a journal memory; and
    wherein the host virtual machine is configured to load instructions from the main memory into its instruction queue, execute the instructions in the instruction queue and write the data into the main memory, and save the instructions into a journal memory of the host virtual machine in the form of journal storage instructions.

6. The computer system according to claim 5, wherein said synchronization between the host virtual machine and the servant virtual machine includes a synchronization of CPU register states and main memories from the host virtual machine to the servant virtual machine.

7. The computer system according to claim 5, wherein said host virtual machine is configured to respond to an I/O instruction by sending a journal storage instruction between said I/O instruction and a previous I/O instruction which is stored in said journal memory of the host virtual machine, to the journal memory of the servant virtual machine.

8. The computer system according to claim 7, wherein the servant virtual machine is configured to execute the journal storage instruction in its journal memory to synchronize the CPU register state and the main memory of the servant virtual machine with those of the host virtual machine.

9. A computer comprising a virtual machine container and a virtual machine running on said virtual machine container, wherein said virtual machine comprises:
- an instruction queue;
- a main memory;
- a journal memory; and
- wherein the virtual machine is configured to load instructions from the main memory into its instruction queue, execute the instructions in the instruction queue and write the data into the main memory, and write the instructions in the form of journal storage instruction into a journal memory of the virtual machine; and
- wherein said virtual machine is further configured to use an I/O instruction as a transaction boundary to trigger a synchronization operation with a virtual machine of an other computer.

10. The computer according to claim 9, wherein said virtual machine is configured, as part of said synchronization operation, to respond to detection of an I/O instruction by sending a journal storage instruction between said I/O instruction and a previous I/O instruction which is stored in said journal memory to a journal memory of the virtual machine of said other computer through a communication channel with said other computer.

* * * * *